(12) United States Patent
Park et al.

(10) Patent No.: US 12,112,745 B2
(45) Date of Patent: Oct. 8, 2024

(54) ELECTRONIC DEVICE AND CONTROL METHOD THEREOF

(71) Applicant: SAMSUNG ELECTRONICS CO., LTD., Suwon-si (KR)

(72) Inventors: Jisun Park, Suwon-si (KR); Minjin Rho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 393 days.

(21) Appl. No.: 17/292,116

(22) PCT Filed: Sep. 9, 2019

(86) PCT No.: PCT/KR2019/011636
§ 371 (c)(1),
(2) Date: May 7, 2021

(87) PCT Pub. No.: WO2020/096193
PCT Pub. Date: May 14, 2020

(65) Prior Publication Data
US 2021/0398529 A1 Dec. 23, 2021

(30) Foreign Application Priority Data
Nov. 8, 2018 (KR) .................. 10-2018-0136738

(51) Int. Cl.
*G10L 15/22* (2006.01)
*G10L 15/01* (2013.01)

(52) U.S. Cl.
CPC .............. *G10L 15/22* (2013.01); *G10L 15/01* (2013.01); *G10L 2015/223* (2013.01)

(58) Field of Classification Search
CPC ... G10L 15/22; G10L 15/01; G10L 2015/223; G10L 17/26; G10L 2015/227;
(Continued)

(56) References Cited

U.S. PATENT DOCUMENTS 5,758,318 A 5/1998 Kojima et al.
7,702,508 B2 4/2010 Bennet
(Continued)

FOREIGN PATENT DOCUMENTS

JP 7-92993 A 4/1995
JP 10-240287 A 9/1998
(Continued)

OTHER PUBLICATIONS

International Search Report dated Dec. 20, 2019 in International Patent Application No. PCT/KR2019/011636.
(Continued)

*Primary Examiner* — Pierre Louis Desir
*Assistant Examiner* — Fouzia Hye Solaiman
(74) *Attorney, Agent, or Firm* — STAAS & HALSEY LLP

(57) ABSTRACT

An electronic device is disclosed. The present electronic device comprises: a voice receiving unit; and a processor, wherein the processor: when a user's voice is received through the voice receiving unit, determines an accumulation level of utterance history information corresponding to the characteristics of the user's voice; when the accumulation level of utterance history information is below a predetermined threshold level, provides response information corresponding to the user's voice on the basis of user information related to the characteristics of the user's voice; and when the accumulation level of utterance history information is equal to or higher than the predetermined threshold level, provides response information corresponding to the user's voice on the basis of the user information and the utterance history information.

12 Claims, 8 Drawing Sheets

(58) Field of Classification Search
CPC ... G10L 15/04; G10L 2015/225; G06F 3/167; G06F 40/56
USPC .................................................... 704/275
See application file for complete search history.

(56) References Cited

U.S. PATENT DOCUMENTS

| | | |
|---|---|---|
| 10,062,376 B2 | 8/2018 | Ryu et al. |
| 10,657,967 B2 | 5/2020 | Chakladar et al. |
| 2008/0005071 A1 | 1/2008 | Flake et al. |
| 2008/0243499 A1* | 10/2008 | Poi ................ G10L 3/063 704/E15.04 |
| 2009/0094221 A1 | 4/2009 | Cameron et al. |
| 2010/0082434 A1 | 4/2010 | Chen et al. |
| 2013/0085848 A1 | 4/2013 | Dyor et al. |
| 2016/0154777 A1* | 6/2016 | Shin ................ G06F 16/9535 715/271 |
| 2016/0180846 A1* | 6/2016 | Lee ................ B60R 16/0373 704/251 |
| 2018/0182385 A1* | 6/2018 | Stahl ................ G10L 15/19 |
| 2018/0197557 A1 | 7/2018 | Guo et al. |
| 2018/0286395 A1 | 10/2018 | Li et al. |

FOREIGN PATENT DOCUMENTS

| | | |
|---|---|---|
| JP | 2008-33149 | 2/2008 |
| JP | 2014-92943 | 5/2014 |
| JP | 2016-109897 | 6/2016 |
| JP | 6310796 | 4/2018 |
| KR | 10-2013-0133629 | 12/2013 |
| KR | 10-1625668 | 5/2016 |
| KR | 10-2016-0065671 | 6/2016 |
| KR | 10-2018-0116100 | 10/2018 |

OTHER PUBLICATIONS

Written Opinion of the International Searching Authority dated Dec. 20, 2019 in International Patent Application No. PCT/KR2019/011636.
Office Action dated May 28, 2024 for corresponding Korean application No. 10-2018-0136738.
Korean Notice of Allowance issued in counterpart Korean Application No. 10-2018-0136738 dated Aug. 7, 2024.

* cited by examiner

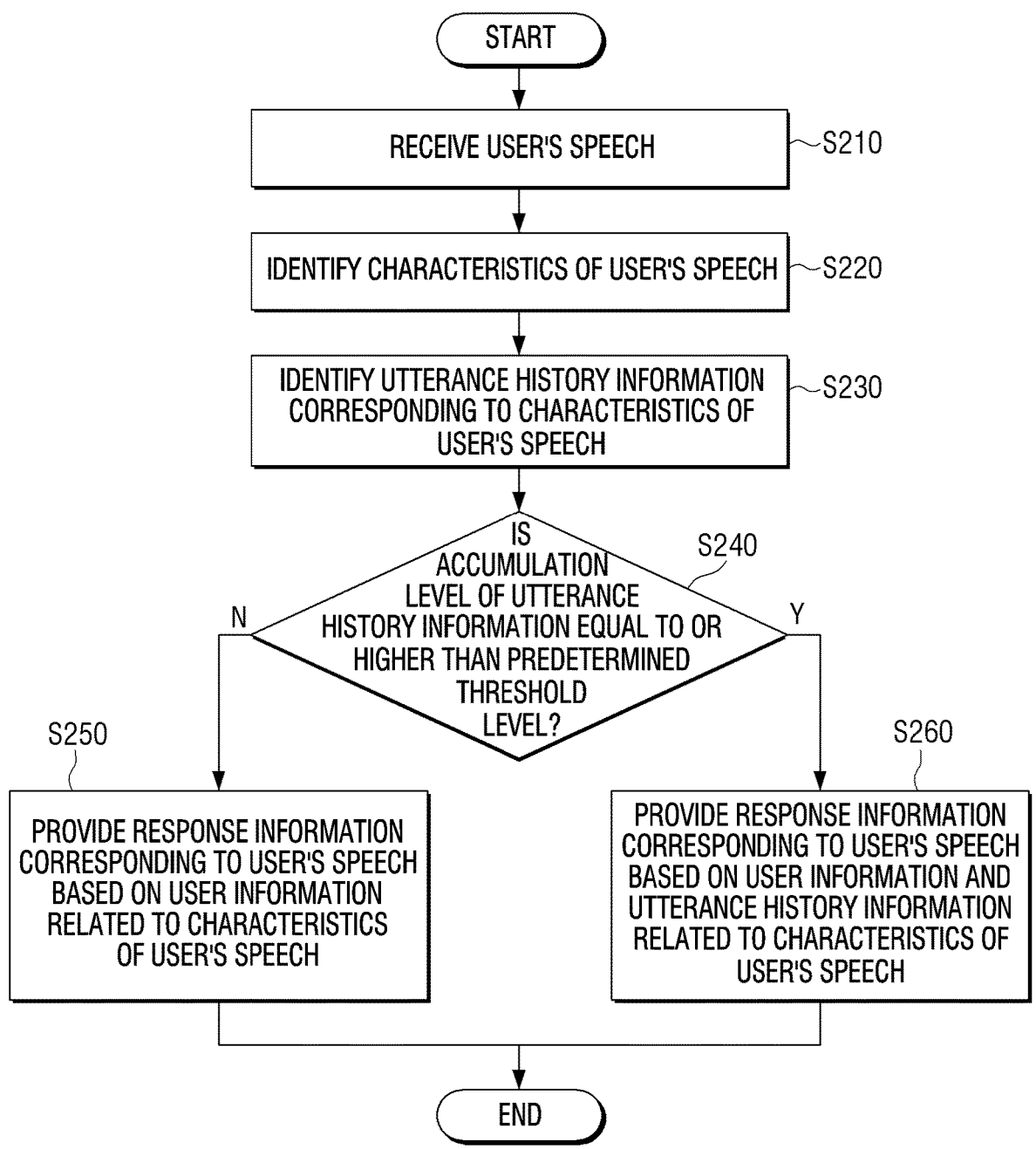

FIG. 3B
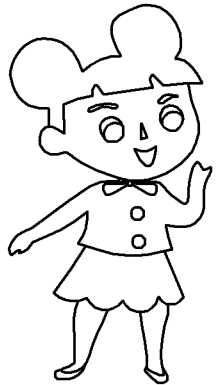

FIG. 4A
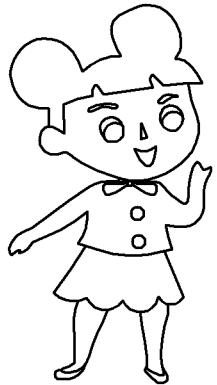

FIG. 4B

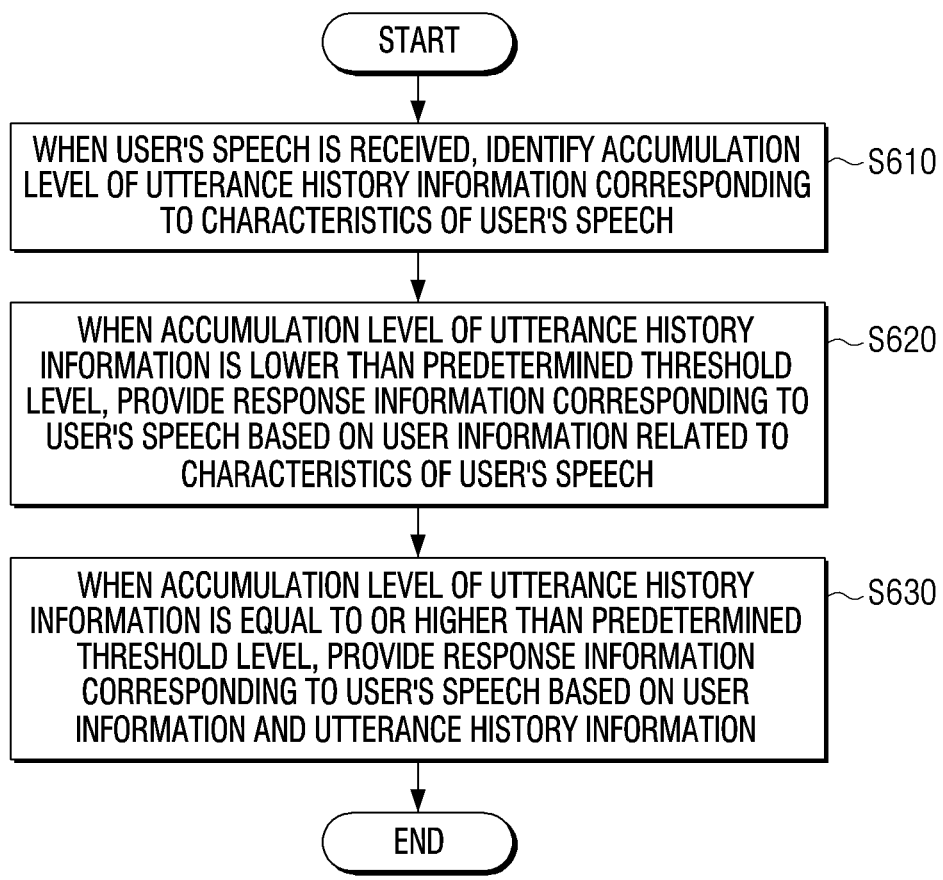

ELECTRONIC DEVICE AND CONTROL METHOD THEREOF

CROSS-REFERENCE TO RELATED APPLICATIONS

This application is a U.S. National Stage Application, which claims the benefit under 35 U.S.C. § 371 of PCT International Patent Application No. PCT/KR2019/011636, filed Sep. 9, 2019 which claims the foreign priority benefit under 35 U.S.C. § 119 of Korean Patent Application No. 10-2018-0136738, filed Nov. 8, 2018, the contents of which are incorporated herein by reference.

TECHNICAL FIELD

The disclosure relates to an electronic device and a control method thereof, and more particularly relates to an electronic device recognizing a user's speech and a control method thereof.

BACKGROUND ART

In recent years, various electronic devices are developed along with development of electronic technologies. Particularly, in recent years, speech recognition devices such as an artificial intelligence (AI) speaker, a smartphone, a smart TV and the like which recognize a user's speech and operates according to the user's speech are developed.

However, when the user's speech is received, the speech recognition device of the related art merely provides response information in a standardized pattern.

For example, if a user utters a speech "How's weather today in Seoul?", the speech recognition device of the related art provides response information in a standardized pattern such as "Today's temperature in Seoul is minus 2 degrees and rainfall is expected as 10 mm."

This does not correspond to needs of users who desire to receive response information in personalized patterns.

DISCLOSURE

Technical Problem

The disclosure is made in view of the aforementioned problems and an object of the disclosure is to provide an electronic device providing response information personalized based on characteristics of user's speech and a control method thereof.

Technical Solution

In accordance with an aspect of the disclosure, there is provided an electronic device including a speech receiver, and a processor configured to, based on a user's speech being received via the speech receiver, identify an accumulation level of utterance history information corresponding to characteristics of the user's speech, based on the accumulation level of the utterance history information being lower than a predetermined threshold level, provide response information corresponding to the user's speech based on user information related to the characteristics of the user's speech, and based on the accumulation level of the utterance history information being equal to or higher than the predetermined threshold level, provide response information corresponding to the user's speech based on the user information and the utterance history information.

The user information may include at least one of information on sex and information on an age group of a user who utters the user's speech, and the processor may be configured to, based on the user's speech being received, obtain the response information corresponding to the user's speech, and provide response information by changing the obtained response information according to the at least one of the information on sex and the information on the age group.

The processor may be configured to, based on the age group being equal to or higher than a predetermined threshold age, operate in a speech recognition mode during a predetermined time from when a user's speech for triggering the speech recognition mode of the electronic device is received, and based on the age group being lower than the predetermined threshold age, extend the predetermined time.

The utterance history information may include information on a user's speech related to a content, and the processor may be configured to provide the response information corresponding to the user's speech by using a content included in the utterance history information.

The utterance history information may include information on a number of times that a subsequent speech is not received during a predetermined time from when a user's speech for triggering a speech recognition mode of the electronic device is received, and the processor may be configured to, based on the user's speech being received, identify the number of times that the subsequent speech is not received based on the utterance history information corresponding to the characteristics of the user's speech, and based on the number of times that the subsequent speech is not received being equal to or more than a predetermined number of times, extend the predetermined time.

The utterance history information may include information on a number of times of errors provided along with failure of recognition of the user's speech, and the processor may be configured to, based on the user's speech being received, identify the number of times of errors based on the utterance history information corresponding to the characteristics of the user's speech, and based on the number of times of errors being equal to or more than a predetermined number of times, provide guide information for speech recognition success.

The processor may be configured to provide guide information for leading to utterance of a subsequent speech after providing the response information.

In accordance with another aspect of the disclosure, there is provided a method for controlling an electronic device, the method including, based on a user's speech being received, identifying an accumulation level of utterance history information corresponding to characteristics of the user's speech, and based on the accumulation level of the utterance history information being lower than a predetermined threshold level, providing response information corresponding to the user's speech based on user information related to the characteristics of the user's speech, and based on the accumulation level of the utterance history information being equal to or higher than the predetermined threshold level, providing response information corresponding to the user's speech based on the user information and the utterance history information.

The user information may include at least one of information on sex and information on an age group of a user who utters the user's speech, and the providing may include, based on the user's speech being received, obtaining the response information corresponding to the user's speech, and providing response information by changing the obtained response information according to the at least one of the information on sex and the information on the age group.

The control method may further include, based on the age group being equal to or higher than a predetermined threshold age, operating in a speech recognition mode during a predetermined time from when a user's speech for triggering the speech recognition mode of the electronic device is received, and based on the age group being lower than the predetermined threshold age, extending the predetermined time.

The utterance history information may include information on a user's speech related to a content, and the providing may include providing the response information corresponding to the user's speech by using a content included in the utterance history information.

The utterance history information may include information on a number of times that a subsequent speech is not received during a predetermined time from when a user's speech for triggering a speech recognition mode of the electronic device is received, and the control method may further include, based on the user's speech being received, identifying the number of times that the subsequent speech is not received based on the utterance history information corresponding to the characteristics of the user's speech, and based on the number of times that the subsequent speech is not received being equal to or more than a predetermined number of times, extending the predetermined time.

The utterance history information may include information on a number of times of errors provided along with failure of recognition of the user's speech, and the providing may include, based on the user's speech being received, identifying the number of times of errors based on the utterance history information corresponding to the characteristics of the user's speech, and based on the number of times of errors being equal to or more than a predetermined number of times, providing guide information for speech recognition success.

The control method may further include providing guide information for leading to utterance of a subsequent speech after providing the response information.

Effect of Invention

According to the various aspects of the disclosure, it is possible to provide response information personalized based on the age group of the user who uttered the speech and/or the utterance history information to the user.

In addition, it is possible to improve a level of competence in using the electronic device by providing the guide information and the like to a user who does not comfortably use the electronic device such as an AI speaker or the like.

DESCRIPTION OF DRAWINGS

FIG. 2 is a flowchart illustrating a method for providing response information based on characteristics of a user's speech according to an embodiment;

FIGS. 3A and 3B are diagrams illustrating an embodiment of providing response information corresponding to the user's speech based on user information related to the characteristics of the user's speech according to an embodiment;

FIGS. 4A and 4B are diagrams illustrating an embodiment of providing response information corresponding to the user's speech based on user information and utterance history information related to the characteristics of the user's speech according to an embodiment;

FIG. 6 is a flowchart illustrating a method for controlling the electronic device according to an embodiment.

DETAILED DESCRIPTION OF EXEMPLARY EMBODIMENTS

The terms used in the specification and claims have been selected as general terms as possible in consideration of functions in the embodiments of the disclosure. But, these terms may vary in accordance with the intention of those skilled in the art, the precedent, technical interpretation, the emergence of new technologies and the like. In addition, there are also terms arbitrarily selected by the applicant. Such terms may be interpreted as meanings defined in this specification and may be interpreted based on general content of the specification and common technical knowledge of the technical field, if there are no specific term definitions.

In addition, in describing the disclosure, a detailed description of the related art or configuration may be omitted when it is determined that the detailed description may unnecessarily obscure a gist of the disclosure.

In addition, hereinafter, the embodiments of the disclosure will be described in detail with reference to the accompanying drawings and content illustrated in the accompanying drawings, but the disclosure is not limited to the embodiments.

Hereinafter, the disclosure will be described in detail with reference to the accompanying drawings.

Figure 1:
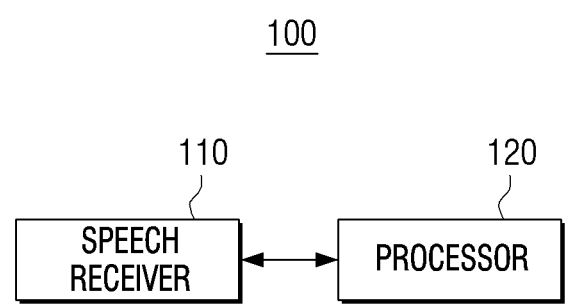
FIG. 1 is a block diagram illustrating an electronic device according to an embodiment.

FIG. 1 is a block diagram illustrating an electronic device according to an embodiment.

Referring to FIG. 1, an electronic device 100 according to an embodiment of the disclosure may include a speech receiver 110 and a processor 120.

The speech receiver 110 may receive a user's speech. Specifically, the speech receiver 110 may receive an analogue signal corresponding to the user's speech.

The speech receiver 110 may be implemented as a microphone. In this case, the speech receiver 110 may be provided on one side of the electronic device 100.

Meanwhile, the speech receiver 110 may be implemented as a wireless communication chip such as a Bluetooth chip or a Wi-Fi chip. In this case, the speech receiver 110 may receive a user's speech input via a microphone of an external device (e.g., remote control) from the external device.

Specifically, if the user's speech is input via the microphone of the external device, the speech receiver 110 may receive an analogue signal corresponding to the user's speech or a user's speech converted into a digital signal from the external device.

Hereinafter, for convenience of description, the description will be made by assuming that the speech receiver 100 is implemented as a microphone.

The processor 120 may control general operations of the electronic device 100. For this, the processor 120 may include one or more of a central processing unit (CPU), an application processor (AP), or a communication processor (CP).

The processor 120 may receive a user's speech via the speech receiver 110. The processor 120 may convert the user's speech that is an analogue signal, into a digital signal. For this, the processor 120 may use an analogue-digital converter (not illustrated).

The processor 120 may convert the user's speech into a text. Specifically, the processor 120 may convert the user's speech into a text by applying a speech-to-text (STT) algorithm to the user's speech converted into the digital signal.

The processor 120 may extract an utterance element from the text. The utterance element herein may refer to a keyword for performing an operation requested by the user as at least one of a plurality of elements included in the user's speech. For example, if a user's speech "How will be the weather tomorrow in Seoul?" is received from the speech receiver 110, the processor 120 may convert the user's speech into a text and extract the utterance elements "tomorrow", "Seoul", "weather", and "How" from the converted text.

The processor 120 may obtain response information corresponding to the user's speech based on the extracted utterance elements. Specifically, the processor 120 may search for information corresponding to the extracted utterance elements and obtain a searched result thereof as the response information.

The processor 120 may provide the obtained response information. Specifically, the processor 120 may provide the response information via a speaker (not illustrated) and/or a display (not illustrated). In the embodiment, the processor 120 may output information on the weather tomorrow in Seoul as a voice via the speaker (not illustrated) or display the information as a text on the display (not illustrated) to provide the information to the user.

The electronic device 100 may be implemented as an AI speaker. However, this is merely an embodiment, and the electronic device 100 may be implemented as various electronic devices capable of recognizing the user's speech such as a smartphone, a table PC, a notebook, a smart TV, and the like. In addition, the electronic device 100 may be implemented as a wearable device such as a smart watch.

Meanwhile, the embodiment in which the electronic device 100 converts the user's speech into a text has been described above, but this may be performed by an external server (not illustrated). Specifically, if the user's speech is received via the speech receiver 110, the electronic device 100 may transmit this to the external server (not illustrated) and the application of the STT algorithm and the like described above may be performed on the external server (not illustrated). In this case, the electronic device 100 may receive response information corresponding to the user's speech from the external server (not illustrated) and provide the received response information to the user.

Meanwhile, when the user's speech is received, the processor 120 may analyze characteristics of the user's speech and provide response information based on the characteristics thereof. Hereinafter, the description will be made with reference to FIGS. 2 to 4B.

FIG. 2 is a flowchart illustrating a method for providing response information based on characteristics of a user's speech according to an embodiment.

The processor 120 may receive the user's speech via the speech receiver 110 (S210). As described above, if the speech receiver 110 is implemented as the microphone, the processor 120 may receive the user's speech via the microphone.

The processor 120 may identify characteristics of the user's speech (S220). Specifically, when the user's speech is received, the processor 120 may identify the characteristics of the user's speech such as an energy and a frequency range of the user's speech and/or a reverberation time (RT) of the user's speech. Meanwhile, the characteristics of the user's speech described above are merely an embodiment and the characteristics of the user's speech may be various characteristics for distinguishing a user uttered the speech from another user.

The processor 120 may identify utterance history information corresponding to the characteristics of the user's speech (S230). Specifically, the processor 120 may identify the utterance history information corresponding to the characteristics of the user's speech received via the speech receiver 110 among the utterance history information stored for each characteristic of the user's speech in a memory (not illustrated).

More specifically, the processor 120 may identify the utterance history information matching to the characteristics of the user's speech within a predetermined error range with the energy, the frequency range of the user's speech and/or the reverberation time of the user's speech received via the speech receiver 110, among the utterance history information stored for each characteristic of the user's speech in the memory (not illustrated), as the utterance history information corresponding to the characteristics of the user's speech received via the speech receiver 110.

Here, the utterance history information may include various pieces of information related to the user's speech. Specifically, the utterance history information may include information on the user's speech received via the speech receiver 110 in the past, information on the number of times that the user's speech is received via the speech receiver 110, information on the number of times of errors provided along with failures of recognition of the user's speech, information related to an utterance speed of the user's speech, and the like.

The processor 120 may identify whether an accumulation level of the utterance history information is equal to or higher than a predetermined threshold level (S240).

Here, the accumulation level may be identified based on the information on the number of times that the user's speech included in the utterance history information is received. For example, the processor 120 may identify the accumulation level of the utterance history information to 1, if the number of times that the user's speech included in the utterance history information is received is 0 to 10 times, and identify the accumulation level of the utterance history information to 2, if the number of times thereof is 11 to 20 times. As described above, the processor 120 may determine the accumulation level of the utterance history information to be high, as the number of times of user's speech received increases.

The threshold level may be variously set according to the user command. For example, the threshold level may be set to 2.

In this case, if the accumulation level of the utterance history information is lower than the predetermined threshold level, the processor 120 may provide response information corresponding to the user's speech based on the user information related to the characteristics of the user's speech (S250), and if the accumulation level of the utterance history information is equal to or higher than the predetermined threshold level, the processor 120 may provide response information corresponding to the user's speech based on the user information and the utterance history information related to the characteristics of the user's speech (S260).

Hereinafter, the description will be made with reference to FIGS. 3A to 4B.

Figure 3A:
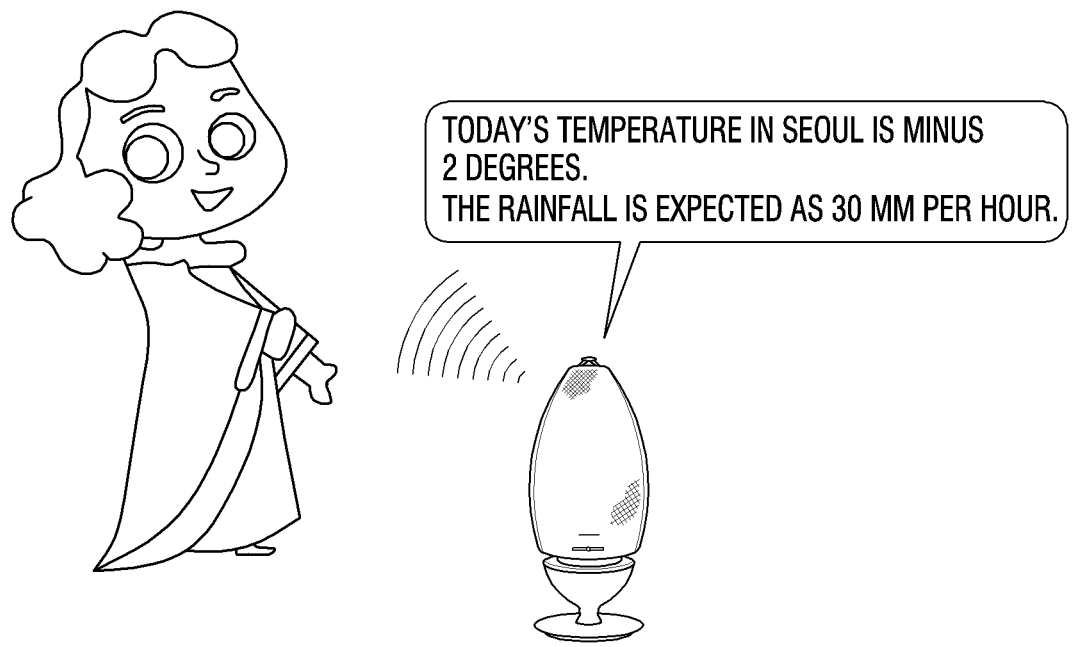

FIGS. 3A and 3B are diagrams illustrating an embodiment of providing response information corresponding to the user's speech based on user information related to the characteristics of the user's speech according to an embodiment.

As described above, when the user's speech is received, the processor 120 may obtain the response information corresponding to the user's speech.

If the accumulation level of the utterance history information is lower than the predetermined threshold level, the processor 120 may provide the response information corresponding to the user's speech based on the user information related to the characteristics of the user's speech.

Herein, the user information related to the characteristics of the user's speech may include at least one of information on the sex and information on an age group of the user uttered the user's speech.

Specifically, if the user's speech is received via the speech receiver 110, the processor 120 may identify at least one of the sex and the age group of the user who uttered the user's speech based on the characteristics of the user's speech such as the energy, the frequency range of the user's speech and/or the reverberation time of the user's speech.

The processor 120 may provide response information by changing the obtained response information according to the at least one of the sex and the age group of the user.

Specifically, the processor 120 may provide response information by changing the obtained response information according to which group the age group of the user belongs to among predetermined groups. A first group of the predetermined groups may include an age group of 10 years of age to older, and a second group may include an age group of 0 to 10 years of age. However, this is merely an embodiment and the predetermined group may be variously set according to the user command.

For example, if the user utters "How's the weather today in Seoul?", the processor 120 may obtain information on the today's weather in Seoul through the STT algorithm described above. If it is determined that the age group of the user belongs to the predetermined first group based on the characteristics of the user's speech, the processor 120 may provide the obtained response information without change, and if it is determined that the age group of the user belongs to the predetermined second group, the processor 120 may provide the response information by changing the obtained response information to correspond to the second group.

Referring to FIG. 3A, in a case where the obtained response information is "Today's temperature in Seoul is minus 2 degrees and rainfall is expected as 30 mm", if it is determined that the user is about 26 years old and the age group belongs to the predetermined first group, the processor 120 may provide the response information "Today's temperature in Seoul is minus 2 degrees and rainfall is expected as 30 mm". In other words, the processor 120 may provide the obtained response information without change.

Referring to FIG. 3B, if it is determined that the user is about 6 years old and the age group belongs to the predetermined second group, the processor 120 may provide the response information by changing words included in the obtained response information or provide the response information by adding at least one of onomatopoeia and mimetic words, such as "Today is a very cold and chilly day. Please be careful not to catch a cold! Looks like it's going to rain soon. Please make sure to bring your umbrella and the rain boots".

In another embodiment, in a case where the user's speech "I brushed my teeth" is received via the speech receiver 110, if it is determined that the age group of the user belongs to the first group, the processor 120 may provide response information "Good job" without hyperbole, and if it is determined that the age group of the user belongs to the second group, the processor 120 may provide with hyperbole by further adding exclamation "Wow! Fantastic! You are a good kid with no cavities".

In addition, in a case where the user's speech "I'm cold" is received via the speech receiver 110, if it is determined that the age group of the user belongs to the first group, the processor 120 may provide the response information to solve the given problem "How about increasing the indoor temperature by 2 degrees?", and if it is determined that the age group of the user belongs to the second group, the processor 120 may provide the response information to solve the given problem while expressing sympathy with the user's situation "It is shivering cold outside. On a days like this, we need to stay warm so we don't catch the cold".

In addition, the processor 120 may provide response information by changing the obtained response information according to whether the sex of the user is a male or female. For example, if the user is identified as a 6-year-old girl, the processor 120 may provide the response information by using a content preferred by the 6-year-old girl.

For example, if it is determined that the content preferred by the 6-year-old girl is a penguin, in the embodiment, the processor 120 may provide the response information "Today is a very cold and chilly day. Please be careful not to catch a cold! Looks like it's going to rain soon. Please make sure to bring your umbrella and the rain boots. Penguin is going to be sad if you get all wet" using the word "penguin".

For this, the processor 120 may store information on contents preferred by the user according to the sex and the age group in advance. In addition, the processor 120 may identify the content preferred by the user who uttered the user's speech based on information on a content received from an external server (not illustrated).

In addition, the above content may be obtained through an artificial intelligence technology. Since the artificial intelligence technology is a technology for a computer machine to learn and determine by itself, the processor 120 may obtain the information on the content preferred by the corresponding sex and age group, through deep learning using an algorithm for classifying/learning by itself the features of pieces of input data.

As described above, by providing the response information by considering the age and the age group of the user who uttered the speech, the disclosure may deliver information with words that arouse user's interest and make the user easily understand according to the age of the user.

Meanwhile, the processor 120 may adjust a speech standby time according to which group the age group of the user belongs to among the predetermined groups.

Specifically, when a user's speech for triggering a speech recognition mode of the electronic device 100 is received, the processor 120 may operate in a speech recognition mode during a predetermined time from the when the user's speech is received. For example, if a trigger speech "Hi, Bixby" is received, the processor 120 may operate in the speech recognition mode during the predetermined time (e.g., five seconds).

The processor 120 may adjust the predetermined time described above, that is, the speech standby time according to which group the age group of the user belongs to among the predetermined groups.

Specifically, if the age group of the user is equal to or higher than the predetermined threshold age, the processor 120 may operate in the speech recognition mode during the predetermined time, and if the age group of the user is lower than the predetermined threshold age, the processor 120 may extend the predetermined time described above.

For example, in a case where the threshold age is 15 years of age, if it is determined that a 6-year-old user utters the speech, the processor 120 may extend the predetermined time to ten seconds.

As described above, by extending the speech standby time considering the user in a young age group (or user in a high age group), the disclosure may solve inconvenience that the user who does not comfortably use the electronic device 100 may experience due to the unexpected end of the speech recognition mode.

FIGS. 4A and 4B are diagrams illustrating an embodiment of providing response information corresponding to the user's speech based on user information and utterance history information related to the characteristics of the user's speech according to an embodiment.

As described above, when the user's speech is received, the processor 120 may obtain the response information corresponding to the user's speech.

If the accumulation level of the utterance history information is equal to or higher than the predetermined threshold level, the processor 120 may provide the response information corresponding to the user's speech based on the user information and the utterance history information related to the characteristics of the user's speech.

The utterance history information may include information on a user's speech related to a content. Specifically, the utterance history information may include information on a user's speech for searching for a specific content, information on a user's speech for reproducing a specific content, and the like.

For example, if the user utters the user's speeches related to a content "penguin" such as "Please find out penguin program" or "When the penguin program is on TV?" predetermined number of times or more, the processor 120 may provide the response information corresponding to the user's speech by using the content "penguin".

FIG. 4A illustrates the response information provided when the user's speech "How's the weather today in Seoul?" is received, if the accumulation level of the utterance history information is lower than the predetermined threshold level. Referring to FIG. 4A, with respect to the user's speech "How's the weather today in Seoul?", the processor 120 may provide the response information "Today is a very cold and chilly day. Please be careful not to catch a cold! Looks like it's going to rain soon. Please make sure to bring your umbrella and the rain boots".

FIG. 4B illustrates the response information provided when the user's speech "How's the weather today in Seoul?" is received, if the accumulation level of the utterance history information is equal to or higher than the predetermined threshold level. If it is determined that the user's speeches related to the content "penguin" are received predetermined number of times or more in the utterance history information, the processor 120 may provide the response information corresponding to the user's speech by using the content "penguin" with respect to the user's speech "How's the weather today in Seoul?" For example, referring to FIG. 4B, the processor 120 may provide the response information "Today is a very cold and chilly day. Please be careful not to catch a cold! Looks like it's going to rain soon. Please make sure to bring your umbrella and the rain boots. Penguin is going to meet his friends with his umbrella".

As described above, by providing the response information in consideration of the characteristics of the user who uttered the speech and the utterance history information, the disclosure may deliver information that arouses user's interest and makes the user easily understand.

Meanwhile, in addition to the above embodiment, the processor 120 may perform various functions based on the pieces of various information included in the utterance history information.

In an example, the utterance history information may include information on the number of times that a subsequent speech is not received within predetermined time from when the user's speech for triggering the speech recognition mode of the electronic device 100 is received.

Specifically, when the user's speech for triggering the speech recognition mode of the electronic device 100 is received, the processor 120 may operate in the speech recognition mode during the predetermined time from when the user's speech is received. For example, when the trigger speech "Hi, Bixby" is received, the processor 120 may operate in the speech recognition mode during the predetermined time (e.g., five seconds).

The processor 120 may end the speech recognition mode, if the subsequent speech is not received while operating in the speech recognition mode, and store the information on the number of times that the subsequent speech is not received within the speech standby time in the utterance history information.

Then, when the user's speech is received, the processor 120 may determine the number of times that the subsequent speech is not received based on the utterance history information, and may extend the predetermined time, if the number of times that the subsequent speech is not received is predetermined number of times or more. In other words, if the number of times that the subsequent speech is not received is the predetermined number of times or more, the processor 120 may extend the speech standby time.

For example, when the predetermined number of times is five times and the predetermined time is five seconds, if it is determined that the speech recognition mode ended due to not receiving of the subsequent speech five times or more, the processor 120 may extend the predetermined time to ten seconds.

This is performed under the consideration of the user not having a high level of competence in using the electronic device 100, and accordingly, the disclosure may solve inconvenience that the user who does not comfortably use the electronic device 100 may experience due to the unexpected end of the speech recognition mode.

Meanwhile, the utterance history information may include the information on the number of times of errors provided due to the failures of the recognition of the user's speech.

Specifically, if the utterance speed of the user's speech is fast as a first threshold value or higher or slow as a second threshold value or lower, if the user's speech includes a plurality of words, the number of which is the threshold value or more, or if a term between the user's speech and the subsequent speech is short as a threshold value or less, the processor 120 may not recognize the user's speech.

In this case, the processor 120 may provide the error information according to the failure of the recognition of the user's speech. For example, the processor 120 may provide the error information "Failed to recognize speech. Please speak again" to the user.

The processor 120 may store the number of times that the error information is provided in the utterance history information.

Then, when the user's speech is received, the processor 120 may determine the number of times that the error information is provided based on the utterance history information, and if the number of times of errors is predetermined number of times or more, the processor 120 may provide guide information for speech recognition success.

Herein, the user's speech may be a trigger speech. When the trigger speech is received, the processor 120 may determine the number of times that the error information is provided based on the utterance history information, and if the number of times of errors is the predetermined number of times or more, the processor 120 may provide the guide information for the speech recognition success.

For example, assuming that the predetermined number of times is five times, when the trigger speech is received, the processor 120 may determine the number of times that the error information is provided based on the utterance history information, and if the number of times of errors is five times or more, the processor 120 may provide the guide information for the speech recognition success.

The guide information may be determined based on a reason of the failure of the speech recognition. Specifically, if the error information is provided the predetermined number of times or more because the utterance speed of the user's speech is fast as a threshold value or higher, the processor 120 may provide the guide information for the speech recognition success "Please speak slowly", and if the error information is provided the predetermined number of times or more because the user's speech includes a plurality of words, the number of which is the threshold value or more, the processor 120 may provide the guide information for the speech recognition success "Please speak in short sentences".

After that, when the user's speech is received, the processor 120 may provide the response information corresponding to the user's speech.

Meanwhile, after providing the response information, the processor 120 may provide guide information for leading to the utterance of the subsequent speech.

For example, after providing the response information, the processor 120 may provide the guide information for leading to the utterance of the subsequent speech "If you have any other questions, please call Bixby loud".

This is performed under the consideration of the user not having a high level of competence in using the electronic device 100, and accordingly, the disclosure may lead to the subsequent utterance of the user who does not comfortably use the electronic device 100 to help him or her to comfortably use the electronic device 100.

Figure 5:
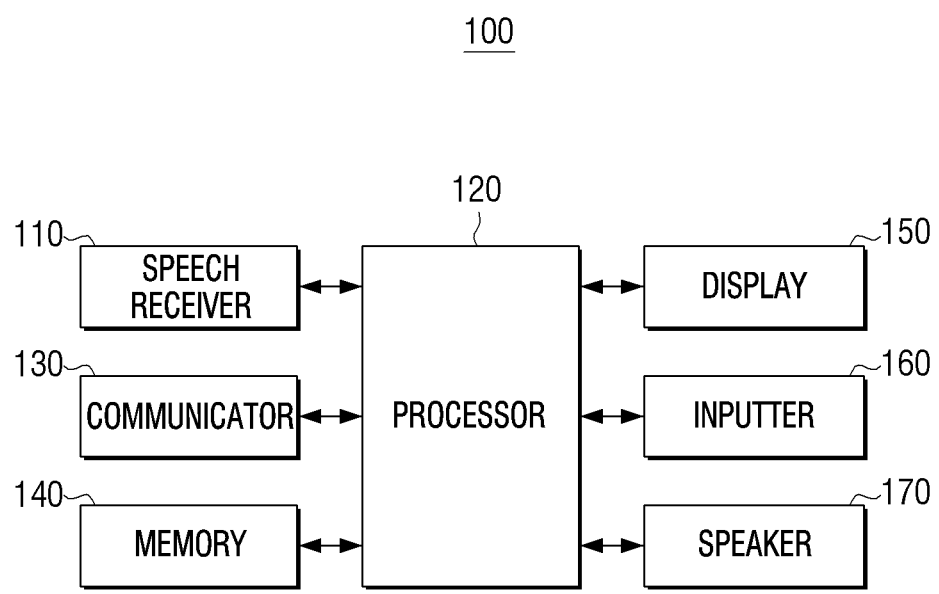
FIG. 5 is a specific block diagram illustrating the electronic device according to an embodiment.

FIG. 5 is a specific block diagram illustrating the electronic device according to an embodiment.

Referring to FIG. 5, the electronic device 100 according to an embodiment of the disclosure may include the speech receiver 110, a communicator 130, a memory 140, a display 150, an inputter 160, a speaker 170, and the processor 120. Hereinafter, the description of the part overlapped with the part described above will be summarized or will not be repeated.

The communicator 130 may communicate with an external device to transmit and receive various pieces of information. Particularly, the communicator 130 may transmit a signal corresponding to the user's speech to an external server. The signal may be an analogue signal corresponding to the user's speech and may also be a digital signal obtained by converting the analogue signal. In addition, the communicator 130 may receive response information corresponding to the user's speech from the external server.

For this, the communicator 130 may include a wireless communication chip, a Wi-Fi chip, a Bluetooth chip, and the like.

The memory 140 may store an operating system (OS) for controlling general operations of constituent elements of the electronic device 100 and instructions or data related to the constituent elements of the electronic device 100.

Accordingly, the processor 120 may control a plurality of hardware or software constituent elements of the electronic device 100 using the various instructions or data stored in the memory 140, and load and process instructions or data received from at least one of other constituent elements on a volatile memory and store the various pieces of data in a non-volatile memory.

Particularly, the memory 140 may store utterance history information for each characteristic of the user's speech. The utterance history information may include the information on the user's speech received via the speech receiver 110, the information on the number of times that the user's speech is received via the speech receiver 110, the information on the number of times of errors provided due to the failure of the recognition of the user's speech, the information on the utterance speed of the user's speech, and the like.

The display 150 may display various screens. For example, the display 150 may display a screen including the response information corresponding to the user's speech.

The display 150 may be implemented in various forms of displays such as a liquid crystal display (LCD), a plasma display panel (PDP), and the like. The display 150 may also include a driving circuit or a backlight unit which may be implemented in a form of a-si TFT, a low temperature poly silicon (LTPS) TFT, or an organic TFT (OTFT). The display 150 may be implemented as a touch screen by combining with a touch detector.

The inputter 160 may receive a user input. The inputter 160 may include a button and a touch screen.

The speaker 170 may output various pieces of audio data obtained by executing various processing such as decoding, amplification, or noise filtering by an audio processor (not shown).

According to an embodiment of the disclosure, the speaker 170 may output the response information corresponding to the user's speech as a sound.

FIG. 6 is a flowchart illustrating a method for controlling the electronic device according to an embodiment.

When the user's speech is received, the electronic device 100 according to an embodiment of the disclosure may identify the accumulation level of the utterance history information corresponding to the characteristics of the user's speech (S610).

Specifically, when the user's speech is received, the electronic device 100 may identify the characteristics of the user's speech such as an energy and a frequency range of the user's speech and/or a reverberation time (RT) of the user's speech, and identify the accumulation level of the utterance history information corresponding to the characteristics of the received user's speech among the utterance history stored in the memory.

When the accumulation level of the utterance history information is lower than the predetermined threshold level, the electronic device 100 may provide the response information corresponding to the user's speech based on the user information related to the characteristics of the user's speech (S620).

Specifically, when the accumulation level of the utterance history information is lower than the predetermined threshold level, the electronic device 100 may provide the response information corresponding to the user's speech based on at least one of sex and age group of the user who uttered the speech.

When the accumulation level of the utterance history information is equal to or higher than the predetermined threshold level, the electronic device 100 may provide the response information corresponding to the user's speech based on the user information and the utterance history information (S630).

Specifically, not only the at least one of sex and age group of the user described above, the electronic device 100 may provide the response information corresponding to the user's speech in consideration of information on the user's speech received in the past, information on the number of times that the user's speech is received, information on the number of times of errors provided along with failures of recognition of the user's speech, information on an utterance speed of the user's speech, and the like included in the utterance history information.

The methods according to the embodiments of the disclosure described above may be implemented in a form of an application installable in the electronic device of the related art.

In addition, the methods according to the embodiments of the disclosure described above may be implemented simply by the software upgrade or hardware upgrade in the electronic device of the related art.

Further, the embodiments of the disclosure described above may be performed through an embedded server provided in the electronic device or an external server of the electronic device.

Meanwhile, a non-transitory readable medium storing a program for sequentially performing the method for controlling the electronic device according to the disclosure may be provided.

The non-transitory computer-readable medium is not a medium storing data for a short period of time such as a register, a cache, or a memory, but may refer to a medium that semi-permanently stores data and is readable by a machine. Specifically, the various applications or programs described above may be stored and provided in the non-transitory computer-readable medium such as a CD, a DVD, a hard disk drive, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
   a speech receiver; and
   a processor configured to:
   based on a user's speech being received via the speech receiver, identify an accumulation level of utterance history information corresponding to characteristics of the user's speech;
   based on the accumulation level of the utterance history information being lower than a predetermined threshold level, provide response information corresponding to the user's speech based on user information related to the characteristics of the user's speech; and
   based on the accumulation level of the utterance history information being equal to or higher than the predetermined threshold level, provide response information corresponding to the user's speech based on the user information and the utterance history information,
   wherein the user information comprises information on an aqe group of a user who utters the user's speech,
   wherein the processor is configured to:
   based on the age group being equal to or higher than a predetermined threshold age, operate in a speech recognition mode during a predetermined time from when a user's speech for triggering the speech recognition mode of the electronic device is received; and
   based on the age group being lower than the predetermined threshold age, extend the predetermined time.

2. The electronic device according to claim 1, wherein the user information comprises information on sex of the user who utters the user's speech, and
   wherein the processor is configured to, based on the user's speech being received, obtain the response information corresponding to the user's speech, and provide response information by changing the obtained response information according to the at least one of the information on sex and the information on the age group.

3. The electronic device according to claim 1, wherein the utterance history information comprises information on a user's speech related to a content, and
   wherein the processor is configured to provide the response information corresponding to the user's speech by using a content included in the utterance history information.

4. The electronic device according to claim 1, wherein the utterance history information comprises information on a number of times that a subsequent speech is not received during a predetermined time from when a user's speech for triggering a speech recognition mode of the electronic device is received, and
   wherein the processor is configured to:
   based on the user's speech being received, identify the number of times that the subsequent speech is not received based on the utterance history information corresponding to the characteristics of the user's speech; and
   based on the number of times that the subsequent speech is not received being equal to or more than a predetermined number of times, extend the predetermined time.

5. An electronic device comprising:
   a speech receiver; and
   a processor configured to:
   based on a user's speech being received via the speech receiver, identify an accumulation level of utterance history information corresponding to characteristics of the user's speech;
   based on the accumulation level of the utterance history information being lower than a predetermined threshold level, provide response information corresponding to the user's speech based on user information related to the characteristics of the user's speech; and
   based on the accumulation level of the utterance history information being equal to or higher than the predetermined threshold level, provide response information corresponding to the user's speech based on the user information and the utterance history information, wherein the utterance history information comprises information on a number of times of errors provided along with failure of recognition of the user's speech, and wherein the processor is configured to:
based on the user's speech being received, identify the number of times of errors based on the utterance history information corresponding to the characteristics of the user's speech; and
based on the number of times of errors being equal to or more than a predetermined number of times, provide guide information for speech recognition success.

6. The electronic device according to claim 5, wherein the processor is configured to provide guide information for leading to utterance of a subsequent speech after providing the response information.

7. A method for controlling an electronic device, the method comprising:
based on a user's speech being received, identifying an accumulation level of utterance history information corresponding to characteristics of the user's speech; and
based on the accumulation level of the utterance history information being lower than a predetermined threshold level, providing response information corresponding to the user's speech based on user information related to the characteristics of the user's speech, and based on the accumulation level of the utterance history information being equal to or higher than the predetermined threshold level, providing response information corresponding to the user's speech based on the user information and the utterance history information,
wherein the user information comprises information on an age group of a user who utters the user's speech,
wherein the method further comprising, based on the age group being equal to or higher than a predetermined threshold age, operating in a speech recognition mode during a predetermined time from when a user's speech for triggering the speech recognition mode of the electronic device is received, and based on the age group being lower than the predetermined threshold age, extending the predetermined time.

8. The method according to claim 7, wherein the user information comprises at least one of information on sex of the user who utters the user's speech, and
wherein the providing comprises, based on the user's speech being received, obtaining the response information corresponding to the user's speech, and providing response information by changing the obtained response information according to the at least one of the information on sex and the information on the age group.

9. The method according to claim 7, wherein the utterance history information comprises information on a user's speech related to a content, and
wherein the providing comprises providing the response information corresponding to the user's speech by using a content included in the utterance history information.

10. The method according to claim 7, wherein the utterance history information comprises information on a number of times that a subsequent speech is not received during a predetermined time from when a user's speech for triggering a speech recognition mode of the electronic device is received, and
wherein the control method further comprises:
based on the user's speech being received, identifying the number of times that the subsequent speech is not received based on the utterance history information corresponding to the characteristics of the user's speech; and
based on the number of times that the subsequent speech is not received being equal to or more than a predetermined number of times, extending the predetermined time.

11. The method according to claim 7, wherein the utterance history information comprises information on a number of times of errors provided along with failure of recognition of the user's speech, and
wherein the providing comprises:
based on the user's speech being received, identifying the number of times of errors based on the utterance history information corresponding to the characteristics of the user's speech; and
based on the number of times of errors being equal to or more than a predetermined number of times, providing guide information for speech recognition success.

12. The method according to claim 7, further comprising:
providing guide information for leading to utterance of a subsequent speech after providing the response information.

* * * * *